United States Patent
Sabesan et al.

(10) Patent No.: US 7,601,212 B2
(45) Date of Patent: Oct. 13, 2009

(54) PIGMENT PARTICLES COATED WITH POLYSACCHARIDES AND HAVING IMPROVED PROPERTIES

(75) Inventors: Subramaniam Sabesan, Wilmington, DE (US); John Davis Bolt, McEwen, TN (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 126 days.

(21) Appl. No.: 11/511,937

(22) Filed: Aug. 28, 2006

(65) Prior Publication Data

US 2007/0181038 A1 Aug. 9, 2007

Related U.S. Application Data

(60) Provisional application No. 60/712,678, filed on Aug. 29, 2005.

(51) Int. Cl.
| | |
|---|---|
| C04B 14/00 | (2006.01) |
| C04B 16/00 | (2006.01) |
| C04B 16/02 | (2006.01) |
| C09C 1/04 | (2006.01) |
| C09C 1/36 | (2006.01) |
| C08K 3/00 | (2006.01) |
| C08K 5/00 | (2006.01) |
| D21F 11/00 | (2006.01) |
| A01N 43/04 | (2006.01) |
| A61K 31/715 | (2006.01) |
| A61K 8/00 | (2006.01) |
| A61K 8/18 | (2006.01) |
| A61Q 17/04 | (2006.01) |
| A61Q 1/02 | (2006.01) |
| A61Q 1/04 | (2006.01) |
| A61Q 5/00 | (2006.01) |
| A61Q 9/00 | (2006.01) |

(52) U.S. Cl. .............. 106/416; 106/401; 106/419; 106/425; 106/429; 106/430; 106/431; 106/436; 106/450; 106/499; 106/501.1; 106/505; 162/146; 162/157.6; 514/57; 424/401; 424/59; 424/63; 424/64; 424/70.1

(58) Field of Classification Search .............. 106/401, 106/419, 425, 429–431, 436, 450, 499, 501.1, 106/505; 162/146, 157.6; 514/57; 424/401, 424/59, 63, 64, 70.1
See application file for complete search history.

(56) References Cited

U.S. PATENT DOCUMENTS

| | | | |
|---|---|---|---|
| 3,205,085 A | 9/1965 | Bailin | |
| 3,290,165 A | 12/1966 | Iannicelli | |
| 3,458,395 A * | 7/1969 | Stalker | 162/175 |
| 3,488,204 A * | 1/1970 | Hardy et al. | 106/447 |
| 3,503,772 A | 3/1970 | Fields | |
| 3,834,924 A | 9/1974 | Grillo | |
| 4,116,628 A * | 9/1978 | Hesse et al. | 427/154 |
| 4,141,751 A | 2/1979 | Moreland | |
| RE30,233 E | 3/1980 | Lane et al. | |
| 4,205,997 A | 6/1980 | Hesse et al. | |
| 4,239,548 A | 12/1980 | Barnard et al. | |
| 4,350,645 A | 9/1982 | Kurosaki et al. | |
| 4,430,001 A | 2/1984 | Schurr | |
| 4,461,810 A | 7/1984 | Jacobson | |
| 4,599,124 A | 7/1986 | Kelly et al. | |
| 4,689,102 A | 8/1987 | Prawdzik et al. | |
| 4,737,194 A | 4/1988 | Jacobson | |
| 4,820,750 A | 4/1989 | Lehr et al. | |
| 5,188,831 A | 2/1993 | Nicoll et al. | |
| 5,288,320 A | 2/1994 | Decelles | |
| 5,425,986 A | 6/1995 | Guyette | |
| 5,679,219 A | 10/1997 | Harms et al. | |
| 5,837,049 A | 11/1998 | Watson et al. | |
| 6,287,681 B1 | 9/2001 | Mehta et al. | |
| 6,290,815 B1 | 9/2001 | Magnin et al. | |
| 6,413,618 B1 | 7/2002 | Parker et al. | |
| 6,551,455 B2 | 4/2003 | Johnson et al. | |
| 6,599,592 B1 | 7/2003 | Schulz | |
| 6,706,372 B2 | 3/2004 | Schulz et al. | |
| 6,709,764 B1 | 3/2004 | Perrin et al. | |
| 6,761,979 B2 | 7/2004 | Yokochi et al. | |
| 6,783,631 B2 | 8/2004 | Schulz | |
| 6,797,697 B2 | 9/2004 | Seiberg et al. | |
| 6,858,200 B2 | 2/2005 | Fowler | |
| 2003/0051635 A1 | 3/2003 | Subramanian et al. | |
| 2003/0138600 A1 | 7/2003 | Dohring et al. | |
| 2005/0008604 A1 | 1/2005 | Schultz et al. | |
| 2005/0123761 A1 | 6/2005 | Hua et al. | |
| 2005/0142094 A1 | 6/2005 | Kumar | |
| 2005/0249682 A1 | 11/2005 | Buseman-Williams et al. | |

FOREIGN PATENT DOCUMENTS

| | | |
|---|---|---|
| EP | 0959101 A | 11/1999 |
| GB | 1025960 | 4/1966 |
| JP | 62-223108 | * 10/1987 |

(Continued)

OTHER PUBLICATIONS

Search Report for PCT/US06/33761.*

(Continued)

*Primary Examiner*—Patricia L Hailey

(57) ABSTRACT

Processes for altering surface properties of pigment particles are provided. The processes include coating the particles with ionic natural polysaccharides or ionic derivatives of natural polysaccharides, providing enhanced properties.

25 Claims, 2 Drawing Sheets

FOREIGN PATENT DOCUMENTS

| | | | |
|---|---|---|---|
| JP | 62223108 A | | 10/1987 |
| JP | 2001-302961 | * | 10/2001 |
| WO | WO 97/07879 | | 3/1997 |
| WO | WO 2004/061013 A2 | | 7/2004 |

OTHER PUBLICATIONS

Alder et al., "The Alkyl Esters of Phosphoric Acid", Willard Chem. Indus. (1942) 51:516.

International Search Report Jan. 17, 2007.

* cited by examiner

E2000950-116-4: paper
E2000950-116-1: Paper+TiO2+Kymene
E2000950-116-2: Paper + ChitoTiO2
E2000950-116-3: paper + Chito-TiO2+ Kymene though they generally refer to pigments or "specialty chemicals", these terms are used here to refer to any suitable substance that is added to a composition to alter its properties such as color, opacity, UV protection, or antimicrobial properties.

PIGMENT PARTICLES COATED WITH POLYSACCHARIDES AND HAVING IMPROVED PROPERTIES

FIELD OF THE INVENTION

The present invention relates to processes for altering surface properties of pigment particles, by coating the particles with ionic natural polysaccharides or ionic derivatives of natural polysaccharides, providing enhanced properties.

BACKGROUND

During paper manufacture, titanium dioxide pigments are added to cellulose fibers for imparting whiteness, opacity, and/or UV protection to the finished product, which generally contains 4%-5% titanium dioxide. Current practice makes inefficient use of the titanium dioxide, which is an expensive paper component. The titanium dioxide particles are not retained well on the cellulose fibers, requiring flocculation treatment with large excesses of titanium dioxide leading to much wasted pigment. Recycling of titanium dioxide from this process increases production costs. In addition this treatment entraps titanium dioxide particles thereby filling cellulose to cellulose bonding sites and weakening the overall paper strength, such that wet strength resins must be added to restore the strength of the paper product.

A particular application demanding high titanium dioxide pigment retention and high quality of optical properties is use in paper incorporated into paper laminates, also called decorative films, for decorative applications. Paper laminates are in general well-known in the art, being suitable for a variety of uses including table and desk tops, countertops, wall panels, floor surfacing, tableware and the like. Paper laminates have such a wide variety of uses because they can be made to be extremely durable, and can be also made to resemble (both in appearance and texture) a wide variety of construction materials, including wood, stone, marble and tile, and can be decorated to carry images and colors.

Typically, the paper laminates are made from papers by impregnating the papers with resins of various kinds, assembling several layers of one or more types of laminate papers, and consolidating the assembly into a unitary core structure while converting the resin to a cured state. The type of resin and laminate paper used, and composition of the final assembly, are generally dictated by the end use of the laminate.

Decorative paper laminates can be made by utilizing a decorated paper layer as the upper paper layer in the unitary core structure. The remainder of the core structure typically comprises various support paper layers, and may include one or more highly-opaque intermediate layers between the decorative and support layers so that the appearance of the support layers does not adversely impact the appearance of the decorative layer. Various papers in the paper layers may contain pigments as well as additives such as wet-strength, retention, sizing (internal and surface) and fixing agents as required to achieve the desired end properties of the paper. In particular, the finished decorative paper in the laminate contains approximately 10% to 65% titanium dioxide pigment to provide opacity, eliminating any show-through of the substrate for the laminate. Thus high retention of titanium dioxide pigment in papers used in decorative paper laminates is important for the manufacture of a decorative paper laminate product.

U.S. Pat. No. 3,503,772 discloses improvement in the paper retention and UV stability properties of titanium dioxide by coating titanium dioxide particles with $SiO_2$ and ZnO, then dry milling in the presence of a water-soluble alkali metal carboxymethylcellulose.

GB 1025960 discloses the use of using titanium dioxide particles coated with chemically aminated polysaccharides to aid retention of titanium dioxide on cellulose for low pigmented paper.

SUMMARY OF THE INVENTION

One aspect of the present invention is a composition comprising an inorganic metal-containing pigment at least partially coated with at least one polysaccharide component, said polysaccharide component comprising at least one compound selected from ionic natural polysaccharides and ionic derivatives of natural polysaccharides.

Another aspect of the present invention is a cellulose-based product comprising a composition comprising titanium dioxide particles at least partially coated with at least one polysaccharide component, said polysaccharide component comprising at least one selected from ionic natural polysaccharides and ionic derivatives of natural polysaccharides.

A further aspect of the present invention is a process for improving the retention by cellulosic fibers of inorganic metal-containing pigment particles, comprising contacting the pigment particles in liquid phase with at least one ionic natural polysaccharide or ionic derivative of a natural polysaccharide, wherein the polysaccharide or ionic derivative of natural polysaccharide forms at least a partial coating on the surface of the particles.

These and other aspects of the present invention will be apparent to one skilled in the art, in view of the following description and the appended claims.

DETAILED DESCRIPTION

Figure 1:
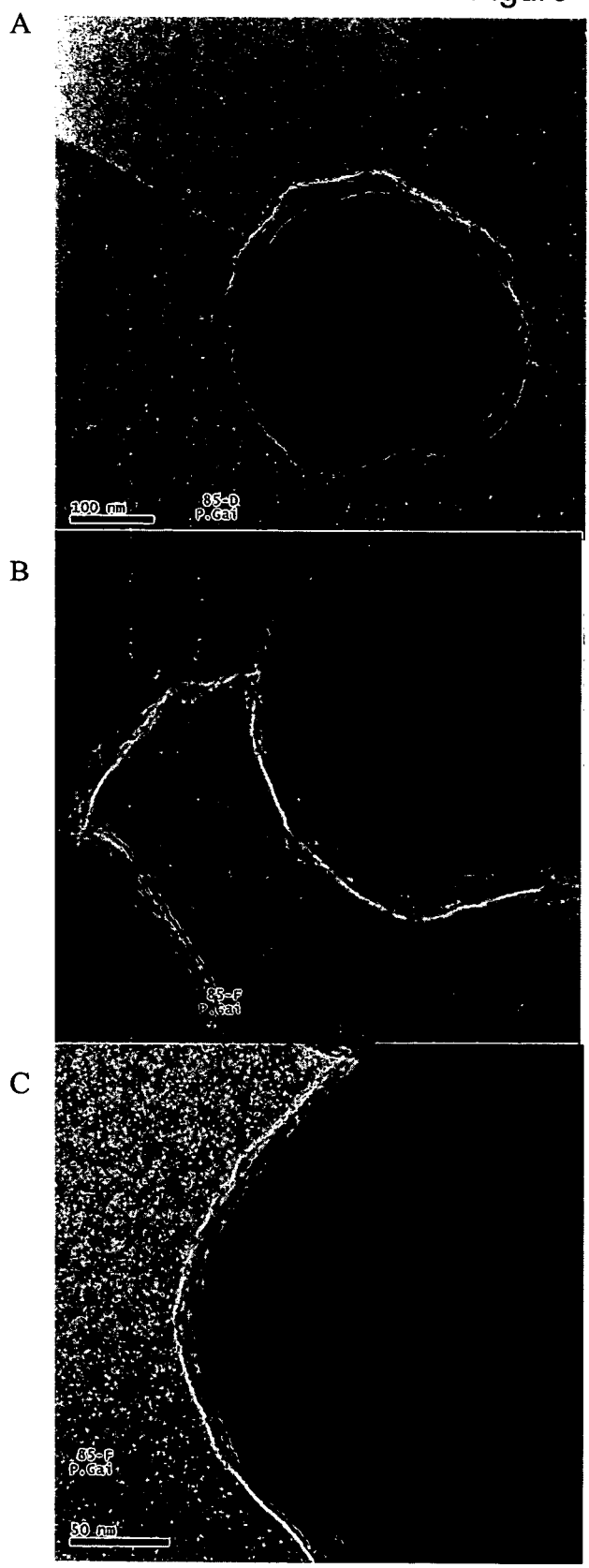
FIG. 1 shows a TEM picture of carboxymethylchitosan (CMCh) treated APS-$TiO_2$: A) 1% aminopropyl trimethoxyoxysilane and 1% CMCh. B) 2% aminopropyl trimethoxyoxysilane and 1% CMCh. C) 3% aminopropyl trimethoxyoxysilane and 1% CMCh.

The present invention provides inorganic metal pigment particles having enhanced properties, including retention on cellulose fibers, wet strength, optical properties, and potentially antimicrobial properties. The inorganic metal pigment particles are preferably titanium dioxide ($TiO_2$) particles. In some embodiments, the inorganic metal pigment particles, particularly $TiO_2$ particles, are modified with organosilanes containing polysaccharide reactive functional groups. The modified and/or unmodified pigment particles are coated with an ionic natural polysaccharide or an ionic derivative of a natural polysaccharide. The polysaccharide coated pigment particles show enhanced binding to paper and thus are useful, for example, in the production of paper products that incorporate $TiO_2$ particles, including decorative papers.

The present invention also provides paper products containing modified and/or unmodified $TiO_2$ particles that are coated with at least one ionic natural polysaccharide and/or an ionic derivative of a natural polysaccharide. The paper products have improved optical properties as well as increased wet strength. In addition, the present invention provides laminate papers that contain modified and/or unmodified pigment particles that are coated with a natural polysaccharide and/or an ionic derivative of a natural polysaccharide, and paper laminates including the laminate paper.

When an amount, concentration, or other value or parameter is recited herein as either a range, preferred range or a list of upper preferable values and lower preferable values, the recited amount, concentration, or other value or parameter is intended to include all ranges formed from any pair of any upper range limit or preferred value and any lower range limit or preferred value, regardless of whether such ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Unless otherwise stated, the following terms, as used herein, have the following meanings.

The term "ionic natural polysaccharide" means a polymer of sugar moieties that occurs in nature and that naturally has a charge, such as a polyglucosamine.

The term "ionic derivative of a natural polysaccharide" means a natural polysaccharide that has been derivatized to provide an additional ionicity. When the starting natural polysaccharide is charged, the derivatization provides an additional charge property to the existing charge property of the natural polysaccharide.

The term "$TiO_2$ particles" or "titanium dioxide particles" means particles containing $TiO_2$. The term, as used herein, may refer to particles of only $TiO_2$, or particles including other components either within or on the surface of the $TiO_2$, including organic materials.

The term "polysaccharide-reactive functional groups" means functional groups of organic material that are capable of forming ionic or covalent bonds with functional groups on an ionic natural polysaccharide or an ionic derivative of a natural polysaccharide.

The term "coated" means having a covering, e.g., a coated surface, and includes a range of extent of covering from partially covered to completely encapsulated. A coating may be discontinuous or continuous. "To coat" means to form a covering on a surface, as of a pigment particle, and includes partial and full coverings. The term "at least partially coated" means that a coating material is on the surface but it need not completely cover the surface. For example, a coating material can cover about 10% of a surface or more, discontinuously or continuously, or up to about 98% of the surface. In some embodiments, the coating covers from about 20% to about 60% of the surface.

The term "substantially encapsulated", as used herein with reference to a pigment particle covered by a coating material, means that the surface of a particle is predominately covered by the coating material. For example, in some preferred embodiments, the surface is at least 80, 85, 90, 95 or 99% covered. In some embodiments, the particle is about 100% covered by the coating material.

According to embodiments of the invention, inorganic metal pigment particles, which can be organic-modified or unmodified, are coated with at least one polysaccharide component, which is an ionic natural polysaccharide or an ionic derivative of a natural polysaccharide. The natural polysaccharides are polymers found in nature that are composed of sugar units. For example, polymers of beta and/or alpha linked glucosamine and galactosamine are natural polysaccharides that are ionic. Chitosan is a natural polymer of β1,4-linked glucosamine units. Polygalactosamines with alpha linkages are found in nature and β-galactosamines in an acylated form are found as structural components of chondrointin sulfate and dermatan sulfate, compounds that are a part of the proteoglycan structure found in cartilage. Some of these polysaccharides are naturally ionic and can be used directly in the instant invention, such as chitosan. Others, such as cellulose, a natural polymer of β1,4-linked glucose units, are not naturally ionic but can be derivatized to introduce ionic functionality.

Through derivatization, ionic function can be introduced that can be cationic, anionic, or zwitterionic. For example, derivatization of cellulose to carboxymethylcellulose provides anionic functionality. Derivatization of chitosan, which is naturally cationic, can add anionic functionality producing a zwitterionic compound. In addition, derivatization can be used to add other types of functionality, thereby providing different properties to the natural polysaccharide. For example, chitosan with a molecular weight greater than about 8,000 daltons is not water-soluble under neutral pH conditions. Derivatization of chitosan to form carboxymethylchitosan makes the polymer soluble at molecular weights greater than about 8,000 daltons, thereby facilitating the coating of particles of pigments such as $TiO_2$.

Natural polysaccharides and their derivatives that have ionic functionality can be used to coat inorganic metal pigment particles to alter their surface properties. The present inventors have found that adding a coating comprising an ionic natural polysaccharide, or an ionic derivative of a natural polysaccharide, to a pigment particle surface, which can be modified and unmodified with organic molecules, improves retention of the coated pigment particles on the cellulose surface as compared to uncoated pigment particles. The ionic natural polysaccharide, or an ionic derivative of a natural polysaccharide, provides a surface to the pigment particle that is similar to the cellulose fibers of a paper surface. Thus, of particular use are ionic cellulose-like natural polysaccharides, or derivatives, such as chitosan and derivatized cellulose. Chitosan is highly preferred for some applications.

Natural ionic natural polysaccharides and ionic derivatives of natural polysaccharides can vary greatly in properties, due to the method of preparation, including length of the polymer, such that the molecular weights of polysaccharides may vary within a sample, and may vary from sample to sample. The molecular weight of a polysaccharide is related to the viscosity of a solution prepared with the polysaccharide. Polysaccharides with higher molecular weights produce solutions of higher viscosity. Solutions of chitosan and other natural polysaccharides, or derivatives, of low, medium and high viscosities can be used in the instant invention. The viscosity refers to that of a 1% solution of the material in aqueous medium measured with a Brookfield LVT Viscometer. Preferred are polysaccharides producing solutions having viscosities of at least about 25 centipoise. More preferred are polysaccharides producing solutions having viscosities of at least about 200 centipoise. Even more preferred are polysaccharides producing solutions of a higher viscosity, e.g., at least about 1,000 centipoise.

The amount of a natural polysaccharide or derivative coating present on inorganic metal pigment particles as reported herein is based on the total amount of the inorganic metal-containing pigment (pigment alone, not including coating) and is preferably from about 0.1 to about 10 weight percent. A more preferred amount is from about 0.1 to about 5 weight %. With $TiO_2$ particles as the inorganic metal pigment, from about 0.1 to about 3 weight percent of the polysaccharide component based on the total $TiO_2$ particle weight can be used. Preferably the amount of polysaccharide component is from about 0.5 to about 2 weight % of the TiO$_2$ particle weight. Even more preferably, the amount of polysaccharide component is about 1 weight %.

The ionic natural polysaccharide or ionic derivative of a natural polysaccharide can be used to coat inorganic metal-containing organic-modified and unmodified pigment particles using any method that allows a coating of polysaccharide to form on the surface of the particles. Generally, methods in which the inorganic metal-containing organic-modified or unmodified pigment and the polysaccharide are in liquid phase allow the polysaccharide to coat the metal pigment. The coating can be partial, complete, or substantially complete, discontinuous, or continuous. For example, the natural polysaccharide or derivative thereof can be added to a suspension of particles that are heated, cooled, frozen and lyophilized to give a dry powder; to particles present in slurry form either separate from or during filtration; to particle wet cake after filtration but before drying; to particles that are then dried by, for example, flash dryer or spray dryer based techniques; or to particles that are then subjected to deagglomeration via wet media milling techniques. In addition, the natural ionic polysaccharide and/or ionic derivative of a natural polysaccharide can be added in portions at different processing stages.

In one process for coating particles, TiO$_2$ organic-modified and/or unmodified particles are suspended in a polysaccharide solution (0.5%-2 weight % polysaccharide, based on the weight of the TiO$_2$), and heated to about 60° C. for about 30 min to form a suspension. The suspension is cooled to room temperature, then frozen and lyophilized to give a dry powder of polysaccharide coated TiO$_2$, with at least a partial coating of polysaccharide on the TiO$_2$ particles.

The coating can be, for example, 1-30 nm in thickness, preferably about 1 to 15 nm, in some preferred embodiments about 10-15 nm in thickness. It is preferred that the particles are at least partially coated. More preferred is a substantially uniform, substantially continuous coating, also called encapsulation.

Coating of particles of organic-modified and unmodified pigments such as TiO$_2$ with an ionic natural polysaccharide or an ionic derivative of a natural polysaccharide can enhance the photostability of some pigment particles. Thus, when incorporated into paper or other products, the polysaccharide coated pigment may exhibit enhanced photostability, as compared to uncoated pigment particles. The present inventors have found that polysaccharide coated TiO$_2$ has increased retention of the TiO$_2$ on cellulosic fibers. Thus polysaccharide coated TiO$_2$ provides more efficient incorporation for paper manufacturing processes, leading to less waste and use of lower amounts of TiO$_2$. When incorporated into paper, the polysaccharide coated TiO$_2$ provides enhanced wet strength. Thus the use of expensive wet strength agents may be reduced when paper is prepared using the polysaccharide coated TiO$_2$.

It is contemplated that any inorganic metal-containing organic-modified or unmodified pigment can be coated with an ionic natural polysaccharide or an ionic derivative of a natural polysaccharide. By inorganic metal-containing pigment is meant an inorganic particulate material that imparts color and opacity to a medium of which it is a component. Examples of media that can have an inorganic metal-containing pigment as a component include cellulose-based materials such as cardboards and papers, as well as inks, paints, and lotions, particularly sun lotions. The inorganic metal-containing pigment can be selected from metal oxides, mixed metal oxides, metal hydroxides, metal sulfides, metal carbonates, metal sulfates, and mixtures thereof. The inorganic metal can be selected from Ca, Mg, Ti, Ba, Zn, Zn, Mo, Si, and Al. Some examples of inorganic metal-containing pigments include ZnS, TiO$_2$, CaCO$_3$, BaSO$_4$, ZnO, MoS$_2$, talc and clay. In particular, titanium dioxide is an especially useful pigment in the processes and products disclosed herein.

Titanium dioxide (TiO$_2$) pigment useful according to the present invention can be in the rutile or anatase crystalline form. It can be made by a chloride process or a sulfate process, which are known processes to those skilled in the art. For example, in a chloride process, TiCl$_4$ is oxidized to TiO$_2$ particles. In a sulfate process, sulfuric acid and ore containing titanium are dissolved, and the resulting solution goes through a series of steps to yield TiO$_2$. Both the sulfate and chloride processes are disclosed in greater detail in *The Pigment Handbook*, Vol. 1, 2nd Ed., John Wiley & Sons, NY (1988), the disclosures of which are incorporated herein by reference.

Preferred titanium dioxide pigment particles for the methods and compositions disclosed herein have an average size of less than 1 micron. Typically, the particles have an average size of from 0.020 to 0.95 microns, more typically, 0.050 to 0.75 microns and most typically 0.075 to 0.50 microns.

Titanium dioxide particles suitable for use according to the present invention can be substantially pure titanium dioxide, or can contain other metal oxides such as silica, alumina and/or zirconia, or phosphorous-containing compounds. Other metal oxides can be incorporated into the pigment particles, for example, by co-oxidizing or co-precipitating titanium compounds with other metal compounds. If co-oxidized or co-precipitated metals are present, they are preferably present (as the metal oxide) in an amount form about 0.1 wt % to about 20 wt %, preferably from about 0.5 wt % to about 5 wt %, and more preferably from about 0.5 wt % to about 1.5 wt %, based on the total pigment weight.

Titanium dioxide particles used for coating with an ionic natural polysaccharide or an ionic derivative of a natural polysaccharide can be free of surface modification, or they can be surface modified prior to coating with the polysaccharide. By "surface modified", as used herein with regard to titanium dioxide pigment particles, is meant particles that have been contacted with at least one organic or inorganic compound such as those disclosed hereinbelow, such that the compounds are adsorbed on the surface of the titanium dioxide particle; or the compound reacts with the particle such that a reaction product of the compound(s) with the particle is present on the surface as an adsorbed species or is chemically bonded to the surface. The compounds or their reaction products or combinations thereof can thus form a single layer or double layer, continuous or non-continuous, on the surface of the pigment. The coating of the polysaccharide or derivative is applied so that it at least partly covers the layer of compound or reaction product(s).

As an example of surface modification of pigment particles, a surface modified pigment particle can have one or more metal oxide and/or phosphate surface layers, such as disclosed in U.S. Pat. No. 4,461,810, U.S. Pat. No. 4,737,194 and WO2004/061013 (the disclosures of which are hereby incorporated by reference herein). The compounds can be applied using techniques known by those skilled in the art. Examples of metal oxides that can be used to modify the surfaces of the pigment particles include silica, alumina, ceria and/or zirconia among others. The compounds can, for example, be present in an amount of from about 0.1 wt % to about 20 wt %, and preferably from about 0.5 wt % to about 10 wt %, based on the total weight of the pigment. Additionally, recycled pigment, for example having insufficient quality of metal oxide layering, can be used as the pigment particles for coating with the ionic natural polysaccharide or the ionic derivative of a natural polysaccharide.

One process includes substantially encapsulating $TiO_2$ particles with a metal oxide, typically a pyrogenic metal oxide. Methods such as, for example, those disclosed in co-owned, co-pending U.S. Patent Publication No. 2003/0051635, are particularly suitable for producing titanium dioxide particles substantially encapsulated with a pyrogenic metal oxide. The oxide deposited on the titanium dioxide particles can be an amorphous pyrogenically-deposited metal oxide. Typically, the pyrogenically-deposited metal oxide is silica, alumina, zirconia, phosphoria, boria, or a mixture thereof. More typical is silica, such as pyrogenic silica deposited by a process such as a process disclosed in U.S. Patent Publication No. 2003/0051635. The thickness of the oxide layer deposited is typically within the range of from about 2 to about 6 nm, but any amount of deposited metal oxide is suitable. The particles are typically more than 99% rutile.

Examples of suitable commercially available titanium dioxide pigments include alumina-coated titanium dioxide pigments such as R700 and R706 (available from E. I. Dupont de Nemours and Company, Wilmington, Del.) and RDI-S (available from Kemira Industrial Chemicals, Helsinki, Finland), alumina/phosphate coated titanium-dioxide pigments such as R796 (available from E. I. Dupont de Nemours and Company, Wilmington, Del.); and alumina/phosphate/ceria coated titanium-dioxide pigments such as R794 (available from E. I. Dupont de Nemours and Company, Wilmington, Del.). Particularly useful are $TiO_2$ particles coated with a single layer of inorganic material consisting of aluminum phosphate known as R796 and commercially available from E. I. Dupont de Nemours and Company (Wilmington, Del.).

Suitable organic materials that can be used to modify the inorganic metal-containing pigment prior to coating with the polysaccharide or derivative include, for example, organo-silanes; organo-siloxanes; fluoro-silanes; organo-phosphonates; organo-phosphoric acid compounds such as organo-acid phosphates, organo-pyrophosphates, organo-polyphosphates, and organo-metaphosphates; organo-phosphinates; organo-sulfonic compounds; hydrocarbon-based carboxylic acids and associated derivatives and polymers; hydrocarbon-based amides; low molecular weight hydrocarbon waxes; low molecular weight polyolefins and co-polymers thereof; hydrocarbon-based polyols and derivatives thereof; alkanolamines and derivatives thereof; and commonly utilized organic dispersing agents; each of which can be utilized either individually or as mixtures, applied in concert or sequentially. Typically, the surface of the titanium dioxide particles substantially encapsulated with a pyrogenically-deposited metal oxide are modified by treatment with an organo-silane.

Organo-silanes can be linear or branched, substituted or unsubstituted, and saturated or unsaturated. Typically, suitable non-hydrolyzable organic groups (R) are non-reactive Alkyl, cycloalkyl, aryl, and aralkyl are typical non-hydrolyzable organic groups, with alkyl being most typical, including the possibility of any of these groups being fully or partially fluorine substituted. When the hydrolyzable R groups are identical, the organo-silane can be represented by $$R^5_x SiR^6_{4-x} \quad (II)$$

wherein $R^5$ is non-hydrolyzable and $R^6$ is hydrolyzable as defined above and x=1–3. Typically $R^6$ includes methoxy, ethoxy, chloro, and hydroxy. Ethoxy is more typical for ease of handling. Typical silanes of formula II are those in which $R^5$ contains 8-18 carbon atoms; $R^6$ is ethoxy; and x=1 to 3.

Silanes in which $R^5$ contains 8-18 carbon atoms are advantageous, for example for enhanced processibility. It may be desirable that $R^6$ for ethoxy for ease of handling. Most typical is octyltriethoxysilane.

Other suitable organo-silanes include silanes such as those disclosed in U.S. Pat. No. 5,560,845 having the general formula $$SiR^1 R^2 R^3 R^4 \quad (I)$$

in which at least one R is a non-hydrolyzable organic group, such as alkyl, cycloalkyl, aryl, or aralkyl, having 1-20 carbon atoms, typically 4-20 carbon atoms, most typically 6-20 carbon atoms, and at least one R is a hydrolyzable group such as alkoxy, halogen, acetoxy, or hydroxy. The other two Rs are, independently, hydrolyzable or non-hydrolyzable as above. It is preferred that at least two, and especially that three, of the Rs are hydrolyzable. The non-hydrolyzable R can be fully or partially fluorine substituted. Typical of such organo-silanes are octyltriethoxysilane, nonyltriethoxysilane, decyltriethoxysilane, dodecyltriethoxysilane, tridecyltriethoxysilane, tetradecyltriethoxysilane, pentadecyltriethoxysilane, hexadecyltriethoxysilane, heptadecyltriethoxysilane and octadecyltriethoxysilane. Mixtures of organo-silanes can be used.

Other suitable organo-siloxanes are of the general formula $$[R^7_n SiO_{(4-n)/2}]_m \quad (III)$$

in which $R^7$ may be organic or inorganic, n=0-3, and m≧2. Polydimethylsiloxane (PDMS), terminated in a multitude of different ways, for example, by trimethylsilyl functionality, and the like are the preferred polysiloxanes. Additionally useful organo-siloxanes include, for example, polymethylhydrosiloxane (PMHS) and polysiloxanes derived from the functionalization (by hydrosilylation) of PMHS with olefins. Most preferred is an akyl trialkoxysilane, where the alkyl group contains polysaccharide reactive functionalities, for example (glycidoxyalkyl)trialkoxysilane and (aminoalkyl) trialkoxysilane.

Organo-silanes and polysiloxanes are commercially available or can be prepared by processes known in the art as disclosed, for example, in S. Pawlenko, *Organosilicon Compounds*, G. Thieme Verlag, New York (1980).

Suitable organo-phosphonates are disclosed in U.S. Pat. No. 5,837,049 and have the general formula

(IV)

in which $R^8$ is an alkyl group or a cycloalkyl group containing 1 to 22 carbon atoms and $R^9$ and $R^{10}$ are each, independently, hydrogen, an alkyl group, a cycloalkyl group, an aryl group, or an aralkyl group. Typically, $R^8$ contains from 1 to 20, more typically 4-20, and even more typically 6-20 carbon atoms and is a straight chain alkyl group. However, organo-phosphonates possessing linear or branched, substituted or unsubstituted and saturated and unsaturated $R^8$, $R^9$ and $R^{10}$ functionality are suitable for use. Organo-phosphonates suitable for use include n-octylphosphonic acid and its esters, n-decylphosphonic acid and its esters, 2-ethylhexylphosphonic acid and its esters, and camphyl phosphonic acid and its esters.

When $R^9$ and $R^{10}$ are both hydrogen, the organo-phosphate is an organo-phosphonic acid, and when at least one of $R^9$ and $R^{10}$ is a hydrocarbyl group, the organo-phosphate is an ester of an organo-phosphonic acid. In the case of esters, $R^9$ and $R^{10}$ typically contain up to 10 carbon atoms and more typically up to 8 carbon atoms (i.e., the ester is an ester of an alcohol containing up to 10, and typically up to 8 carbon atoms). $R^9$ and $R^{10}$ can be different but frequently are the same. Suitable esters include ethyl esters, butyl esters, octyl esters, cyclohexyl esters, and phenyl esters.

In addition to the above-disclosed organo-phosphonates, organo-phosphonate derivatives possessing hydrolyzable halogen functionality examples of which include n-octylphosphonic dichloride, n-decylphosphonic dichloride and 2-ethylhexylphosphonic dichloride can also be used.

Suitable organo-phosphoric acid compounds include an organo-acid phosphate, an organo-pyrophosphate, an organo-polyphosphate, an organo-metaphosphate, or a salt of any of the aforementioned organo-phosphoric acid compounds as disclosed in U.S. Pat. No. 6,713,543 and having the general formula $$(R^{11}-O)_y PO(OH)_z \qquad (V)$$

wherein y=1 or 2; z=3−y; and $R^{11}$ is an organic group having from 2 to 22 carbon atoms.

The phrase "organo-acid phosphate" as used herein includes compounds represented by Formula V. In the organo-acid phosphate of Formula V, the organic groups may be linear or branched, substituted or unsubstituted, and saturated or unsaturated. Typically $R^{11}$ is a linear hexyl- or octyl-aliphatic group or a branched hexyl- or octyl-aliphatic group.

Suitable organo-pyrophosphate or organo-polyphosphate compounds can be represented by the formula:

$$R^{12}_a-P_{(a-2)}O_{4+[3(a-3)]} \qquad (VI)$$

wherein a=4-14; and each $R^{12}$ is an organic group having from 2 to 22 carbon atoms or hydrogen and within any one molecule, any two or more $R^{12}$ groups may be the same provided that at least one of the $R^{12}$ groups is not hydrogen.

The symbol $R^{12}$ as used in Formula VI denotes any organic group that contains from 2 to 22 carbon atoms or hydrogen. Within any molecule the $R^{12}$ groups may all be the same moiety or they may be different moieties. The organic groups may be linear or branched, substituted or unsubstituted, and saturated or unsaturated. If the $R^{12}$ groups are all the same moieties, then they cannot be hydrogen. Typically at least one of the $R^{12}$ groups is hydrogen and at least one of the $R^{12}$ groups will be linear hexyl or octyl aliphatic groups or branched hexyl or octyl aliphatic groups. Examples of organopyrophosphate acid compounds and organopolyphosphate acid compounds include caprylpyrophosphate, 2-ethylhexylpyrophosphate, dihexylpyrophosphate, dihexylammoniumpyrophosphate, dioctylpyrophosphate, diisooctylpyrophosphate, dioctyltriethanolaminepyrophosphate, bis(2-ethylhexyl)pyrophosphate, bis(2-ethylhexyl) sodium pyrophosphate, tetraethylpyrophosphate, tetrabuytipyrophosphate, tetrahexylpyrophosphate, tetraoctylpyrophosphate, pentahexyltripolyphosphate, pentaoctyltripolyphosphate, tetrahexyl sodium tripolyphosphate, tetrahexylammoniumtripolyphosphate, pentahexyl sodium tetrapolyphosphate, trioctyl sodium tetrapolyphosphate, trioctyl potassium tetrapolyphosphate, hexabutyltetrapolyphosphate, hexahexyltetrapolyphosphate, and hexaoctyltetrapolyphosphate.

Suitable organo-metaphosphate compounds can be represented by the formula:

$$(R^{13}PO_3)_b \qquad (VII)$$

wherein b=1-14, and each $R^{13}$ is an organic group having from 2 to 22 carbon atoms or hydrogen and within any one molecule, any two or more $R^{13}$ groups may be the same provided that at least one of the $R^{13}$ groups is not hydrogen.

The symbol $R^{13}$ as used in Formula VII denotes any organic group that contains from 2 to 22 carbon atoms or hydrogen. The organic groups may be linear or branched, substituted or unsubstituted, and saturated or unsaturated. "b" may be from about 1 to about 14, and typically "b" is from about 4 to about 14. Within any molecule, the $R^{13}$ groups may all be the same moiety or they may be different moieties. If the $R^{13}$ groups are all the same moieties, then they cannot be hydrogen. Typically at least one of the $R^{13}$ groups will be a linear hexyl or octyl aliphatic group or a branched hexyl or octyl aliphatic group. Examples of organo-metaphosphates include ethylmetaphosphate, propylmetaphosphate, butylmetaphosphate, hexylmetaphosphate, and octylmetaphosphate.

The organo-phosphoric acids can be utilized in their acidic or salt forms. Examples of suitable salts are the potassium, sodium, ammonium, and aluminum salts and salts formed with alkanolamines such as triethanolamine of the substances identified by Formula V, Formula VI, or Formula VII.

Organo-acid phosphates are readily available commercially or can be prepared by procedures known to those skilled in the art, such as those procedures disclosed in U.S. Pat. No. 4,350,645. Organo-pyrophosphates and organo-polyphosphates are readily available commercially or produced according to the procedures that are known to persons skilled in the art. Organo-metaphosphates may also be produced according to the procedures that are known to persons skilled in the art. Examples of procedures for synthesizing organo-pyrophosphates, organo-polyphosphates, and organo-metaphosphates are disclosed in Alder, Howard and Woodstock, *Willard Chem, Indus.*, 1942, 51:516.

Suitable organo-phosphinates include those having the general formulas $$R^{14}P(O)H(OR^{15}) \qquad (VIII)$$

and $$R^{16}R^{17}P(O)(OR^{18}) \qquad (IX)$$

wherein $R^{14}$, $R^{16}$, $R^{17}$ are alkyl groups or cycloalkyl groups containing 1 to 22 carbon atoms and $R^{15}$ and $R^{18}$ are each, independently, hydrogen, an alkyl group, a cycloalkyl group, an aryl group, or an aralkyl group. Typically, $R^{14}$, $R^{16}$, $R^{17}$ contain from 1 to 20, more typically 4-20, and even more typically 6-20 carbon atoms and are straight chain alkyl groups. However, organo-phosphinates possessing linear or branched, substituted or unsubstituted and saturated and unsaturated $R^{14}$, $R^{15}$, $R^{16}$, $R^{17}$, and $R^{18}$ functionality are suitable for use. $R^{16}$ and $R^{17}$ can be different but frequently are the same. Phosphorus compounds of use include, but are not limited to, n-hexylphosphinic acid and its esters (VIII), n-octylphosphinic acid and its esters (VIII), di-n-hexylphosphinic acid and its esters (IX) and di-n-octylphosphinic acid and its esters (IX).

When $R^{15}$ and $R^{18}$ are both hydrogen the above formula represents an organo-phosphinic acid and when at least one of $R^{15}$ and $R^{18}$ is a hydrocarbyl group the formula represents an ester of an organo-phosphinic acid. In the case of esters, typically, $R^{15}$ and $R^{18}$ contain up to 10 carbon atoms and more typically up to 8 carbon atoms (i.e. the ester is an ester of an alcohol containing up to 10, and typically up to 8 carbon atoms). Suitable esters include ethyl esters, butyl esters, octyl esters, cyclohexyl esters, and phenyl esters.

In addition to the above disclosed organo-phosphinates, organo-phosphinate derivatives possessing hydrolyzable halogen functionality, examples of which include, chloroethylphosphine oxide and chlorodiethylphosphine oxide, can also be used.

Organo-sulfonic compounds, as disclosed in U.S. Pat. No. 6,646,037 and represented by Formula X, which includes not only organo-sulfonic acids, but also their salts, can also be used:

$$(R^{19}SO_3)_c M^{c+} \quad (X)$$

where $R^{19}$ represents a saturated, unsaturated, branched, linear, or cyclic organic group having from 2 to 22 carbon atoms; c equals 1, 2, 3, or 4; and M represents hydrogen, a metal ion, ammonium ion or organoammonium ion such as protonated triethanolamine. Typically, if M is a metal ion, it is a metal ion with a valence of +1, +2, +3, or +4 such as $Na^{1+}$, $Ca^{2+}$, $Mg^{2+}$, $Al^{3+}$, or $Ti^{4+}$. Typically, $R^{19}$ is hexyl-, octyl-, or 2-ethylhexyl-. These organo-sulfonic compounds of Formula X may be synthesized de novo or obtained from commercial sources.

Suitable hydrocarbon-based carboxylic acids include those that possess linear or branched, substituted or unsubstituted and saturated or unsaturated (including aromatic) functionality as well as one or more carboxylic acid groups. Typically, the acids contain about 2-28, more typically 2-18, and most typically 2-12 carbon atoms. The acids can be applied to the particle surface as the free acid or as a neutralized salt. Examples of suitable acids include maleic, malonic, fumaric, benzoic, phthalic, stearic, oleic, and linoleic.

Also suitable are esters and partial esters formed by the reaction of the above disclosed hydrocarbon-based carboxylic acids with organic hydroxy compounds that possess linear or branched, substituted or unsubstituted, and saturated or unsaturated (including aromatic) functionality and, typically, 1 to 6 hydroxyl (OH) groups. Examples of appropriate non-aromatic hydroxy compounds include ethylene glycol, propylene glycol, trimethylolpropane, diethanolamine, triethanolamine, glycerol, hexanetriol, erythritol, mannitol, sorbitol, and pentaerythritol. Examples of appropriate aromatic hydroxy compounds include, but are not limited to, bisphenol A, hydroquinone, and phloroglucinol. Examples of suitable esters and partial esters are disclosed in U.S. Pat. No. 5,288,320.

Polyesters derived from the self-condensation of, for example, 12-hydroxystearic acid or from, for example, the condensation of a dicarboxylic acid containing compound with a dihydroxyl containing compound can also be used.

Suitable hydrocarbon-based amides include those that possess linear or branched, substituted or unsubstituted and saturated or unsaturated (including aromatic) functionality. Typically, said amides will possess about 8-22, more typically 12-22, and most typically 18-22 carbon atoms. Examples of suitable amides include stearamide, oleamide, and erucamide.

Also suitable for surface modification are compounds derived from relatively low molecular weight hydrocarbon waxes and polyolefins, the latter either homopolymeric, for example, polyethylene or polypropylene, or derived from the co-polymerization of, for example, ethylene with one or more of propylene, butylene, vinylacetate, acrylates, or acrylamide.

In addition to the above disclosed additives, also useful treatments surface modification are hydrocarbon-based polyols, alkanolamines, and derivatives thereof, for example, esters and partial esters. Examples of suitable polyols include species such as glycerol and the commonly utilized particle grinding aids trimethylolethane and trimethylolpropane. Examples of suitable alkanolamines include diethanolamine and triethanolamine.

Common organic dispersing agents that can be used include citric acid, polyacrylic acid, and polymethacrylic acid as well as the more complex, specialty polymeric organic dispersing agents possessing anionic, cationic, zwitterionic, or non-ionic functionality and whose structures are typically trade secrets but are usually derived from linear, comb, star, brush, or dendrimer based polymer chain and pendant substituent morphologies.

Organic compounds for surface modification can also include various inorganic-based dispersing aids, which are usually phosphate, polyphosphate, pyrophosphate, and metaphosphate derived and are typically added, either as the acids or associated salts, to particle slurries.

Mixtures of organic surface modification materials are contemplated, including mixtures of such materials from within one class of compounds, for example mixtures of organo-silanes, or mixtures of such materials from within two or more classes, for examples mixtures of organo-silanes and organo-phosphonates.

Weight content of the organic materials used for surface modification of the pigment particles, based on total weight of the pigment, may be typically about 0.05 to about 5 weight %, and more typically about 0.1 to about 1.5 weight %, and still more preferably about 1 wt %, based on the total weight of the pigment and the organic surface modification material.

In some embodiments, at least a portion of the pigment can be surface-modified (also referred to herein as "surface treated") with an amino organosilane prior to coating with the polysaccharide or ionic derivative of polysaccharide. Suitable amino organosilanes are disclosed, for example, in U.S. Pat. Nos. 3,290,165; 3,834,924; 4,141,751 and 4,820,750, the disclosures of which are incorporated herein by reference.

In preferred embodiments, an organosilane is used to modify the pigment particles prior to coating with the polysaccharide or polysaccharide derivative, which confers polysaccharide-reactive functional groups to the surface of the pigment particles. While it is not intended that the invention be bound by any particular theory, it is believed that addition of reactive groups to the surface of the particles primes the particles for binding to an ionic natural polysaccharide or ionic derivative of a natural polysaccharide.

Preferred organosilanes are those of the general formula (I)

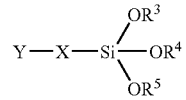

wherein:
Y is glycidyl, cynato, isocynato, thiocynato, iosthiocynato, amino, alkyamino, dialkylamino, or carboxyl.
$R^3$, $R^4$ and $R^5$ are each independently selected from hydrogen, lower alkyl, aryl, lower alkylaryl, lower arylalkyl, alkenyl, cycloalkenyl, alkene, alkylene, arylene, alkylarylene, arylalkylene and cycloalkylene; and
X is alkyl, aryl, alkylaryl, arylalkyl, cycloalkyl, alkenyl, cycloalkenyl, alkene, alkenylene, cycloalkenylene, alkylene, arylene, alkylarylene, arylalkylene, cycloalkylene, with or without secondary and/or tertiary nitrogen pendant from the chain or other functional groups.

The method of adding the organic surface modification material to the inorganic metal-containing pigment, particularly titanium dioxide particles, is not critical, and the inorganic metal-containing pigment, particularly titanium dioxide particles, can be treated with the organic surface treatment material in a number of ways. For example, the organic material can be added either neat or via solution to the inorganic metal-containing pigment, particularly titanium dioxide particles, while the particles are either in a dry state or in a wet state. Examples of carrying out the process with the particles in a dry state include the addition of the inorganic metal-containing pigment (1) to conveyed particles via injector mixer technology such as that disclosed in U.S. Pat. No. 4,430,001 or WO 97/07879 or (2) to particles undergoing deagglomeration in a micronizer (the material typically added to the micronizer feed block or to conveyed pigment up to about several feet past the exit of the micronizer) or in a dry media mill. Examples of carrying out the process with the particles in the wet state include the addition of the inorganic metal-containing pigment (1) to particles present in slurry form either separate from or during filtration, (2) to particle wet cake after filtration but before drying, (3) to particles that are being dried by, for example, flash dryer or spray drier based techniques or (4) to particles undergoing deagglomeration via wet media milling techniques. In addition, the organic material can be added in portions at different processing stages. For example, one-half of the material can be added during a drying step and the remaining half at a subsequent stage such as during a deagglomeration operation such as during micronizing.

Additional treatments of organic material for surface modification can be carried out, to form additional layers, prior to coating with the polysaccharide or polysaccharide derivative. The method of adding organic surface treatment materials is not critical and any of the aforementioned methods can be used for subsequent treatments. In a preferred embodiment, the additional layers of organic surface treatment material beyond the first layer of organic surface treatment material are formed by adding organic material via the use of an apparatus for coating particles, such as powdery or granular materials, as disclosed in WO 97/07879 or in U.S. Pat. No. 4,430,001. Use of the disclosed apparatus for treating the pigment particles with the organic surface treatment material involves metering a liquid composition comprising the organic surface treatment material, where the liquid composition is either a solution, slurry, or melt, into a flow restrictor and injecting a gas stream through the flow restrictor concurrently with the metering of the liquid composition comprising (b) and optionally (c) to create a zone of turbulence at the outlet of the flow restrictor, thereby atomizing the liquid composition. The gas stream can be heated, if necessary. Dried titanium dioxide particles substantially encapsulated with a pyrogenically-deposited metal oxide can be added to the zone of turbulence concurrently with the metering of the liquid composition and the injection of the heated gas to mix the titanium dioxide particles with the atomized liquid composition. Alternatively, the titanium dioxide particles can be added downstream of the zone of turbulence. The mixing at the zone of turbulence treats the inorganic metal-containing pigment, and in particular titanium dioxide particles, with the organic surface treatment material.

The organic-modified treated as disclosed above, or unmodified pigments, are coated with a natural polysaccharide or an ionic derivative of a polysaccharide, according to embodiments of the present invention.

Coated pigments comprising an ionic natural polysaccharide or an ionic derivative of a natural polysaccharide disclosed herein can be employed to fill a wide variety of component needs in applications such as in papers, films, inks, lotions, paints, enamels, and other finishes.

Manufactured cellulose-based products such as paper, wherein whiteness and opacity are desired properties, may include inorganic metal-containing powders coated with at least one ionic natural polysaccharide or an ionic derivative of a natural polysaccharide. Preferably, $TiO_2$ particles coated with at least one natural polysaccharide or an ionic derivative of a natural polysaccharide can be substituted for $TiO_2$ particles with no natural polysaccharide coating during paper manufacture to provide enhanced retention on the cellulose fibers, and improved optical properties and wet strength. $TiO_2$ particles coated with at least one ionic natural polysaccharide or an ionic derivative of a natural polysaccharide can be used in the paper manufacture process in any typical amount. For example, amounts of about 50 weight percent of particles to about 120 weight percent of particles, relative to cellulose pulp slurry weight, can be used.

$TiO_2$ particles coated with at least one ionic natural polysaccharide or an ionic derivative of a natural polysaccharide are particularly useful in decorative paper or paper used to prevent color show-through from filler sheets, where whiteness and high opacity are important features. The use of $TiO_2$ particles coated with at least one ionic natural polysaccharide or an ionic derivative of a natural polysaccharide enhances the retention of the pigment such that attaining an about 10% to 45%, even up to about 65% $TiO_2$ particle content (based on the total dry weight of the sheet; depending on the application) that is desired for whiteness and/or opacity in some applications is more easily achieved with less waste and less use of retention agents than when $TiO_2$ particles that have not been coated with the polysaccharide are used. Use of retention agents is well known to one skilled in the art, and the degree of retention agent required a particular pigment can be determined by such skilled persons.

Decorative papers and papers used to prevent color show-through from filler sheets are preferably laminate papers. One or more sheets of laminate paper can be incorporated into a paper laminate that is constructed as a substantially unitary consolidated structure containing a plurality of layers. A laminate paper can be impregnated with resin. Examples of papers used in paper laminates are disclosed in U.S. Pat. Nos. 6,599,592; 5,679,219; 6,706,372 and 6,783,631, the disclosures of which are incorporated by reference herein. Particularly useful in laminate paper are $TiO_2$ particles having a single layer of inorganic surface treatment containing aluminum phosphate, that are then coated with an ionic natural polysaccharide or an ionic derivative of a natural polysaccharide. The aluminum phosphate layer provides light fastness as disclosed in WO2004061013, and the polysaccharide enhances retention of the pigment on the paper as well as providing increased photostability and wet strength. In some embodiments, non-laminate papers contain smaller amounts of $TiO_2$ than papers for use in laminate applications, e.g., about 45% or less, down to about 4%.

Paper laminates incorporating pigment particles coated with an ionic natural polysaccharide or an ionic derivative of a natural polysaccharide as disclosed herein can be made by any of the conventional processes well known to those skilled in the art, including by both low- and high-pressure lamination processes.

It has been found desirable during the production of such laminates, by either low- or high-pressure lamination processes, to impart abrasion-resistant characteristics to the decorative surface portion of the laminate to enhance the utility of such laminates in end-use applications such as table and countertops, wall panels and floor surfacing. Such abrasion resistance can, for example, be imparted to paper laminates by means of an applied overlay sheet that provides a barrier over the print sheet. If the print sheet is decorative, it is generally desired that the overlay be substantially transparent. Abrasion-resistant resin coatings can also be applied to the surface of the laminate.

It is also desirable to impart moisture barrier properties to the base of some paper laminates, which can be done by bonding a moisture-barrier layer to the base of the laminate.

Further examples paper laminates are disclosed, for example, in U.S. Pat. Nos.: RE 30, 233; 4,239,548; 4,599,124; 4,689,102; 5,425,986; 5,679,219; 6,287,681; 6,290,815; 6,413,618; 6,551,455; 6,706,372; 6,709,764; 6,761,979; 6,783,631; and U.S. Patent Publication 2003/0138600, the disclosures of which are incorporated by reference herein.

In some embodiments a composition of inorganic metal-containing pigment coated with chitosan and/or a derivative of chitosan can be used in making a wide range of antimicrobial and/or anti-odor materials. Chitosan coated $TiO_2$, for example, provides antimicrobial and antiodor properties to materials where $TiO_2$ is commonly incorporated such as in papers, films, cosmetics, and lotions. In addition, chitosan coated $TiO_2$ may be incorporated into other materials and articles where it is desirable to reduce microbial growth in or on the article in the end-use for which the particular article is commonly used. Such articles include packaging for food, personal care (health and hygiene) items, and cosmetics. Compositions containing chitosan coated pigment particles can also be used in pharmaceutical applications fashioned as inhalers. Examples of end-use applications, other than packaging, in the area of food handling and processing that benefit from antimicrobial functionality are coatings for components of food handling and processing equipment.

Devices used in fluid, e.g., water, transportation and/or storage can also benefit from compositions containing the coated pigment particles. Exemplary devices include pipes and tanks. The inner surface, outer surface, or both surfaces of a pipe or tank can comprise an antifouling surface containing the coated pigment particle.

In order to impart antimicrobial functionality to a product, chitosan coated particles can be incorporated into the material of which the product is made, before it is manufactured, or after, or at any time during manufacture of the product. For example, chitosan coated $TiO_2$ can be incorporated during the manufacture of an article, or can be included in a paint or other surface coating that is applied following manufacture of the article.

Compositions of inorganic metal-containing pigments coated with at least one ionic natural polysaccharide or an ionic derivative of a natural polysaccharide are also particularly useful in personal care creams, such as cosmetics and lotions. The coating can provide enhanced distribution of the pigment particles, as well as other properties, such as water resistance and/or improved sun protection, to the cosmetic or lotion formulation in which the coated particles are incorporated. The coated particles can be mixed into the cream formulation using methods well known to one skilled in the art. The coated pigment can be included in formulations that additionally include one or more conventional cosmetic or dermatological additives or adjuvants, such as, for example, fillers, surfactants, thixotropic agents, antioxidants, preserving agents, dyes, pigments, fragrances, thickeners, vitamins, hormones, moisturizers, UV absorbing organic sunscreens, UV scattering inorganic sunscreens, wetting agents, cationic, anionic, nonionic or amphoteric polymers, and hair coloring active substances. Such additives and adjuvants are well known in the field of cosmetics and are disclosed, for example, in *Harry's Cosmeticology*, 8$^{th}$ edition, Martin Rieger, ed., Chemical Publishing, New York (2000).

The personal care compositions can also contain, for example, thixotropic or gelling agents, antioxidants, preserving agents, dyes, pigments, fragrances, thickeners, vitamins, hormones, UV absorbers, and/or other agents known in the art.

The personal care compositions can be anhydrous and comprise a fatty phase in a proportion generally of from about 10 to about 90% by weight relative to the total weight of the composition, wherein the fatty phase contains at least one liquid, solid or semi-solid fatty substance. The fatty substances include, but are not limited to oils, fats, waxes, gums, and so-called pasty fatty substances. The oils in the fatty phase may be of mineral, animal, plant or synthetic origin, and may or may not be volatile at room temperature. These anhydrous compositions can be in various forms such as, an oily gel, solid products, such as compacted or cast powders, or alternatively sticks such as, for example lipsticks. When the compositions according to the present invention are in the form of an oily gel, they generally contain a thixotropic or gelling agent, examples of which are given supra. The thixotropic agents can be present in various proportions depending on the desired texture of the compositions. However, in most cases, they are present in a proportion of from about 1 to about 20% by weight relative to the total weight of the composition.

The personal care compositions can form stable dispersions in the form of a water-in-oil (W/O) or oil-in-water (O/W) emulsion, which comprise: a fatty phase, as described supra, in a proportion of from about 0.1 to about 50% by weight relative to the total weight of the emulsion; an aqueous phase in a proportion of from about 50 to about 98.9% by weight relative to the total weight of the emulsion, in a proportion of from about 1% to about 5% by weight relative to the total weight of the emulsion; and at least one emulsifier in a proportion of from about 1 to about 10% by weight relative to the total weight of the emulsion. Suitable emulsifiers are well known in the field of cosmetic products.

Examples of specific types of personal care compositions that can be made using the compositions include: skin cleansing compositions, make-up, facial lotions, cream moisturizers, body washes, body lotions, foot creams, hand creams, sunscreen creams and lotions, shaving lotions, cream depilatories, lotion depilatories, facial masks made with clay materials, lipstick, eyeshadow, foundation, anti-aging products, hair conditioners, and hair treatment creams. Though some of the personal care compositions disclosed herein typically have human application, personal care compositions for other animals, particularly mammals, more particularly canine, feline, or equine, can also be made using the compositions containing the coated pigment particles.

In preferred embodiments, a composition of inorganic metal-containing pigment coated with at least one ionic natural polysaccharide or an ionic derivative of a natural polysaccharide is useful in sunscreen compositions including any composition that may be topically applied to the skin or lips, including but not limited to, lotions, creams, gels, sticks, sprays, ointments, cleansing liquid washes, cleansing solid bars, pastes, foams, powders, shaving creams, lip balms, lipsticks, and wipes.

The sunscreen compositions can comprise several types of cosmetically-acceptable topical carriers including, but not limited to, solutions, colloidal suspensions, dispersions, emulsions (microemulsions, nanoemulsions, multiple and non-aqeous emulsions), hydrogels, and vesicles (liposomes, niosomes, novasomes). Components and formulation methods of suitable cosmetically-acceptable topical carriers are well known in the art and are disclosed, for example, in U.S. Pat. No. 6,797,697; and U.S. Patent Application Publication Nos. 2005/0142094 and 2005/0008604), the disclosures of which are incorporated herein by reference. Those skilled in the art will appreciate the various methods for producing these various product forms.

The sunscreen compositions can comprise various sunscreen agents for additional sunscreen capability. These sunscreen agents may be organic sunscreen agents including organic polymers that scatter ultraviolet radiation, as described above; inorganic sunscreen agents, such as titanium dioxide not coated with an ionic natural polysaccharide or an ionic derivative of a natural polysaccharide, zinc oxide, cerium oxide, or iron oxide; peptide-based inorganic sunscreen agents, as described by Buseman-Williams et al. (copending and commonly owned U.S. patent application Ser. No.11/069858, which is incorporated herein by reference); and mixtures thereof.

Typically, the cosmetically acceptable medium for sunscreen compositions comprises water and other solvents which include, but are not limited to, mineral oils and fatty alcohols. The cosmetically-acceptable medium is from about 10% to about 99.99% by weight of the composition, preferably from about 50% to about 99% by weight of the composition, and can, in the absence of other additives, form the balance of the composition.

The sunscreen composition may further comprise known components of cosmetic compositons, including, but not limited to, hydrocarbons, esters, fatty alcohols, fatty acids, emulsifying agents, humectants, viscosity modifiers, and silicone based materials. The total concentration of such added ingredients usually is less than 50%, preferably less than 20%, and most preferably less than 10% by weight of the total composition. Those skilled in the art will appreciate the various concentrations and combinations for employing these basic components to achieve the desired product form.

Further, the sunscreen compositions may comprise one or more conventional functional cosmetic or dermatological additives or adjuvants, providing that they do not interfere with the mildness, performance or aesthetic characteristics desired in the final products. The CTFA Cosmetic Ingredient Handbook, Eight Edition (2000), and McCutheon's Functional Materials, North America and Internationals Editions, MC Publishing Co. (2003), which are incorporated herein by reference in their entirety, describe a wide variety of cosmetic and pharmaceutical ingredients commonly used in skin care compositions, which are suitable for use in the compositions of the present invention. The sunscreen compositions can contain a wide range such additional, optional components. The total concentration of added ingredients usually is less than about 20%, preferably less than about 5%, and most preferably less than about 3% by weight of the total composition. Such components include, but are not limited to, surfactants, emollients, moisturizers, stabilizers, film-forming substances, fragrances, colorants, chelating agents, preservatives, antioxidants, pH adjusting agents, antimicrobial agents, water-proofing agents, dry feel modifiers, vitamins, plant extracts, hydroxy acids, and sunless tanning agents. Examples of common raw materials and suitable adjuvants for a sunscreen composition are disclosed, for example, in U.S. Pat. Nos. 6,858,200, and 5,188,831, the disclosures of which are incorporated herein by reference.

The presence in the sunscreen composition of the coated particles can provide enhanced water resistance and/or sunscreen protection as compared to conventional sunscreen compositions not containing such particles. The treatment of the particles as disclosed herein can enhance the distribution of the particles in sunscreen and other compositions.

EXAMPLES

The present invention is further illustrated in the following Examples. It should be understood that these Examples, while indicating specific embodiments of the invention, are given by way of illustration only. From the above discussion and these Examples, one skilled in the art can ascertain the essential characteristics of this invention, and without departing from the spirit and scope thereof, can make various changes and modifications of the invention to adapt it to various usages and conditions.

The meaning of abbreviations is as follows: "sec" mean second(s), "cps means centipoise, "TM" is the brand name for Primex chitosan, "TEM" means transmission electron microscopy, "ml" means milliliter(s), "L" means liter(s), "g" means gram(s), "h" means hour, "min" means minute, "mm" means millimeter(s), "cm" means centimeter(s), "nm" means nanometer(s), "N" means Newton, "Hz" means Hetrtz, "MPa" means Megapascal.

General Materials and Methods

Highly de-N-acetylated (>80%) chitosan samples of low viscosity (viscosity 26 cps), medium viscosity (215 cps), and high viscosity (1107 cps) were purchased from Primex, (Siglufjordur, Iceland) or Dainichiseika Color & Chemicals Mfg. Co., Ltd. (Tokyo, Japan). Sodium carboxymethylcellulose was purchased from Aldrich Chemical Co. (Milwaukee, Wis.). Titanium dioxide of laminate grade, R796, is available from E. I. duPont de Nemours and Company, Wilmington Del.). (3-Glycidoxypropyl)-triethoxysilane (Glycidyl siloxane) and (3-aminopropyl)trimethoxyoxysilane (APS) were purchased from Gelest, Inc. (Morrisville, Pa.).

Preparation of Sodium Carboxymethylchitosan

Chitosan (100.0 g, low viscosity) was suspended in isopropanol (500 ml) and vigorously stirred under nitrogen atmosphere. A solution of sodium hydroxide (50.0 g) in water (100 ml) was slowly added to the chitosan slurry. After 45 minutes, chloroacetic acid (60.0 g) was added as a solid in four portions over a period of twenty minutes. The temperature was maintained at 60° C. and reaction mixture was stirred vigorously at this temperature for three hours. The reaction mixture was cooled to room temperature followed by the addition of cold water (36 ml). Glacial acetic acid was added in drops to the slurry to bring the pH down to 7.0. The product was filtered and washed with a mixture of 70:30 MeOH:$H_2O$ (1.0 L), followed by anhydrous methanol, and dried under high vacuum for 16 h. The weight of the carboxymethylchitosan product was 121.33 g.

Preparation of $TiO_2$ Modified with Glycidyl Siloxane or Aminopropyltrimethoxysilane Titanium dioxide R796 (50.0 g) was stirred in a solution of trialkoxysilane reagent (1 to 3 wt. % relative to $TiO_2$) in n-heptane (200 ml) at 50° C. for 60 min, then the solvent was removed under reduced pressure. The solid obtained was dried at 100° C. under nitrogen for 2 h. The trialkoxysilane reagent was glycidyltriethoxysilane (Gly), used to produce Gly-TiO$_2$. The process was repeated using aminopropyltrimethoxysilane (APS) to produce APS-TiO$_2$.

Example 1

Coating of TiO$_2$ and Siloxane Modified TiO$_2$ with Chitosan, Carboxymethylchitosan Sodium salt (CMCh), and Sodium Carboxymethylcellulose 0.5% and 1% chitosan solutions were prepared by dissolving high viscosity chitosan in deionized water containing acetic acid (50 wt. % relative to chitosan). Carboxymethylchitosan sodium salt and sodium carboxymethylcellulose solutions (1%) were made by dissolving each polysaccharide in deionized water at room temperature. TiO$_2$, Gly-TiO$_2$ or APS-TiO$_2$, prepared as disclosed in General Methods, was suspended in a polysaccharide solution (0.5%-2% polysaccharide relative to TiO$_2$), and heated to 60° C. for 30 min. The suspension was cooled to room temperature, then frozen and lyophilized to give a dry powder of polysaccharide treated TiO$_2$.

The presence of polysaccharide on the surface of the TiO$_2$ particles was visualized by transmission electron microscopy (TEM). As shown in FIG. 1, the aminopropyl trimethoxyoxysilane and carboxymethylchitosan formed a surface coating that encapsulated the TiO$_2$ particle. R796 particles without polysaccharide treatment were seen to have a non-uniform phosphate coating with an average thickness of about 10-13 nm. With siloxane and polysaccharide treatment the surface coating was nearly double in thickness with uncoated particle surface areas were filled in.

Example 2

Method for Measurement of Cellulose Retention of TiO$_2$ particles

Shredded, refined eucalyptus paper (Munksjo, Mass.) was soaked in deionized water for 24 h and made into an aqueous pulp in a blender to give approximately 1% by weight of paper solution. To this paper slurry, TiO$_2$ or modified TiO$_2$ was added, the pH of the slurry was adjusted to 9.0 with aqueous sodium aluminate solution (27%) and the pigment was thoroughly dispersed by stirring. To this TiO$_2$ paper slurry, wet strength agent Kymene® (Hercules, Wilmington, Del.) at 5% by weight relative to paper pulp was added and the solution pH was adjusted to 5.0 with aluminum sulfate solution. After 10 min with stirring at room temp, the slurry pH was raised to 6.5 with aluminum sulfate solution. The slurry was diluted 20 times with deionized water and filtered through a 100 micron wire mesh filter. Handsheets were then rolled out on filter paper (Whatman, qualitative), then dried at 100° C. for 4 h under dry nitrogen. Circles of 7 cm diameter were cut from the paper and then ashed in oxygen atmosphere and the ash percentage calculated The ash content indicates the % of TiO$_2$ that remained on the paper pulp. The experiments were conducted at least in triplicate.

Using this method, cellulose retention of R796 TiO$_2$ particles, with no polysaccharide treatment, was analyzed. Hand sheets were made with R796 in the amounts of 50%, 75% and 100% relative to cellulose pulp slurry weight and the ash content was determined. Three or five separate hand sheets were prepared for each percentage of R796. As shown in Table 1 below, the retention ranged from 26.6% to 39.1% depending on the amount of pigment used. To achieve close to 40% retention of R796 TiO$_2$, this pigment must be added in an amount that is 100% of the cellulose pulp slurry weight. With 50% of R796 TiO$_2$, there is an average of only 28% retention, and at 75% the average retention is 36%.

TABLE 1

Retention of R796 TiO$_2$ on cellulose
The average is given for each set of samples with the same treatments.

| % R796 TiO$_2$ relative to pulp | % Ash | Average |
|---|---|---|
| 100 | 37.9 | 38.44 |
| 100 | 38.6 | |
| 100 | 38.1 | |
| 100 | 39.1 | |
| 100 | 38.5 | |
| 75 | 37.1 | 36.00 |
| 75 | 36.2 | |
| 75 | 36.6 | |
| 75 | 35.8 | |
| 75 | 36.7 | |
| 50 | 29.0 | 28.00 |
| 50 | 29.1 | |
| 50 | 29.0 | |
| 50 | 26.6 | |
| 50 | 27.2 | |

Example 3

Retention Properties of Chitosan Coated Glycidyltriethoxysilane-TiO2 Particles

Titanium dioxide R796 was modified with 1% glycidyltriethoxysilane as discussed in General Methods, and then treated with 1% chitosan as disclosed in Example 1. Three different sizes of chitosan were used in separate treatments: 1) low viscosity, LVC, viscosity less than 30 cps; 2) medium viscosity chitosan, MVC, viscosity under 500 cps; and 3) high viscosity chitosan, HVC, viscosity over 500 cps. Hand sheets containing glycidylsiloxane-TiO$_2$, with no chitosan treatment as a control, and glycidylsiloxane-TiO$_2$ coated with chitosan were made by using 50% TiO$_2$ relative to paper pulp weight and their retention properties were measured. The results in Table 2 show that retention of Gly-TiO$_2$ increases with all three viscosities of chitosan treatment, with the high viscosity chitosan giving the greatest improvement in retention. The high viscosity chitosan greatly increased the retention of the TiO$_2$ pigment on cellulose fibers, from an average of 24.0% to 33.4%.

TABLE 2

Retention of R796 Gly-TiO$_2$ with chitosan treatment on cellulose
The average is given for each set of samples with the same treatments.

| 1% Gly-TiO$_2$ Treatment | % Ash | Average |
|---|---|---|
| None | 22.89 | 24.0 |
| None | 23.00 | |
| None | 26.09 | |
| Low Visc Chitosan | 24.32 | 27.0 |
| Low Visc Chitosan | 27.84 | |
| Low Visc Chitosan | 28.85 | |
| Med Visc Chitosan | 32.99 | 29.43 |
| Med Visc Chitosan | 30.60 | |
| Med Visc Chitosan | 31.57 | |
| Med Visc Chitosan-R | 25.03 | |
| Med Visc Chitosan-R | 26.36 | |
| Med Visc Chitosan-R | 30.05 | |

TABLE 2-continued

Retention of R796 Gly-TiO$_2$ with chitosan treatment on cellulose
The average is given for each set of samples with the same treatments.

| 1% Gly-TiO$_2$ Treatment | % Ash | Average |
|---|---|---|
| High Visc Chitosan | 33.45 | 33.37 |
| High Visc Chitosan | 34.42 | |
| High Visc Chitosan | 36.20 | |
| High Visc Chitosan-R | 32.01 | |
| High Visc Chitosan-R | 33.53 | |
| High Visc Chitosan-R | 29.59 | |
| High Visc Chitosan-R2 | 33.44 | |
| High Visc Chitosan-R2 | 33.60 | |
| High Visc Chitosan-R2 | 34.06 | |

The designation R refers to the repeat of the experiment on a different day. R2 refers to the repeat on a third day.

Example 4

Retention Properties of TiO2 with Different Glycidyitriethoxysilane and Chitosan Treatments Titanium dioxide R796 was modified with 1%, 2%, or 3% glycidyltriethoxysilane and then treated with 1% or 2% high viscosity chitosan. Hand sheets containing glycidyltriethoxysilane-TiO$_2$ and glycidyltriethoxysilane-TiO$_2$ treated with high viscosity chitosan were made by using 50% TiO$_2$ relative to paper pulp weight and their retention properties measured. The results in Table 3 show that modification with varying levels of siloxane had little effect on retention. Treatments with both 1% and 2% high viscosity chitosan gave high levels of retention, while 1% chitosan treatment had slightly higher retention.

TABLE 3

Retention with varying Gly- and chitosan treatments
The average is given for each set of samples with the same treatments.

| % Gly | % High Visc Chitosan | % Ash | Average |
|---|---|---|---|
| 1 | 1 | 33.01 | 32.76 |
| 1 | 1 | 32.46 | |
| 1 | 1 | 32.81 | |
| 2 | 1 | 34.17 | 32.37 |
| 2 | 1 | 32.14 | |
| 2 | 1 | 30.79 | |
| 3 | 1 | 33.23 | 31.64 |
| 3 | 1 | 32.07 | |
| 3 | 1 | 29.61 | |
| 1 | 2 | 29.55 | 30.09 |
| 1 | 2 | 30.38 | |
| 1 | 2 | 30.34 | |
| 2 | 2 | 30.61 | 30.34 |
| 2 | 2 | 30.99 | |
| 2 | 2 | 29.43 | |
| 3 | 2 | 31.00 | 30.24 |
| 3 | 2 | 29.50 | |
| 3 | 2 | 30.23 | |

Example 5

Retention Properties of Chitosan coated TiO$_2$ without Siloxane Modification

Samples of titanium dioxide R796 with 1% siloxane and without siloxane modification were treated with 1% high viscosity chitosan. Hand sheets with 50% pigment to pulp were made, and the retention properties measured. The results in Table 4 show that chitosan enhanced the retention of the titanium dioxide pigment on cellulosic fibers both with and without siloxane modification.

TABLE 4

Retention with chitosan treatment alone, or with Gly-modification
The average is given for each set of samples with the same treatments.

| % Gly | % High Visc Chitosan | % Ash | Average |
|---|---|---|---|
| NONE | NONE | 25.89 | 27.49 |
| NONE | NONE | 27.42 | |
| NONE | NONE | 29.16 | |
| NONE | 1 | 33.95 | 32.78 |
| NONE | 1 | 32.84 | |
| NONE | 1 | 31.55 | |
| 1 | NONE | 27.82 | 27.81 |
| 1 | NONE | 28.05 | |
| 1 | NONE | 27.57 | |
| 1 | 1 | 33.00 | 32.75 |
| 1 | 1 | 32.45 | |
| 1 | 1 | 32.81 | |

Example 6

Retention Properties of TiO$_2$ with Lower Concentration Chitosan Treatment

Titanium dioxide R796 modified with 1% glycidylsiloxane was treated with 1% or 0.5% high viscosity chitosan. Hand sheets with 50% pigment to pulp were made, and the retention properties measured. The results in Table 5 show that treatment with 0.5% chitosan was about as effective for the retention of TiO$_2$ pigment by cellulosic fibers as was 1% chitosan.

TABLE 5

Retention with lower concentration chitosan treatment.
The average is given for each set of samples with the same treatments.

| % Gly | % High Visc Chitosan | % Ash | Average |
|---|---|---|---|
| 1 | 1 | 33.45 | 34.69 |
| 1 | 1 | 34.42 | |
| 1 | 1 | 36.20 | |
| 1 | 0.5 | 33.07 | 33.81 |
| 1 | 0.5 | 34.54 | |

Example 7

Retention Properties of Gly-TiO2 or APS-TiO2 with Carboxymethyichitosan Treatment Samples of titanium dioxide R796 alone, or modified with 1% glycidylsiloxane (Gly-TiO$_2$) or aminopropylsiloxane (APS-TiO$_2$), were treated with 1% or 0.5% high viscosity carboxymethylchitosan (CMCh). Hand sheets were made with 50% pigment to pulp, and the retention properties were measured. The results in table 6 show treatment with high viscosity carboxymethylchitosan increased retention of siloxane modified and unmodified R796 as compared to controls given in previous Examples.

TABLE 6

Retention with different siloxane modifications and carboxymethylchitosan treatment
The average is given for each set of samples with the same treatments.

| Type Siloxane | % High Visc CmCh | % Ash | Average |
|---|---|---|---|
| none | 1 | 29.03 | 29.78 |
| none | 1 | 30.00 | |
| none | 1 | 30.30 | |
| Gly | 1 | 29.43 | 29.08 |
| Gly | 1 | 30.69 | |
| Gly | 1 | 27.12 | |
| APS | 1 | 28.86 | 29.45 |
| APS | 1 | 30.05 | |
| APS | 1 | 29.44 | |
| none | 0.5 | 27.13 | 28.78 |
| none | 0.5 | 28.89 | |
| none | 0.5 | 30.33 | |
| Gly | 0.5 | 33.00 | 32.36 |
| Gly | 0.5 | 30.97 | |
| Gly | 0.5 | 33.11 | |
| APS | 0.5 | 31.86 | 31.63 |
| APS | 0.5 | 32.04 | |
| APS | 0.5 | 30.99 | |

Example 8

Retention Properties of APS-TiO2 with Carboxymethylcellulose Treatment with Varying Amount Relative to Pulp Samples of titanium dioxide modified with 1% aminopropylsiloxane (APS-TiO$_2$), and 1% or 0.5% high viscosity sodium carboxymethylcellulose (SCMCel) were used to make hand sheets with 50% or 75% pigment to pulp, and the retention properties measured. The results in Table 7 show that APS-TiO2 treated with SCMCel has improved retention.

TABLE 7

Retention of APS-TiO$_2$ with carboxymethylcellulose treatment
The average is given for each set of samples with the same treatments.

| % APS-TiO$_2$ relative to pulp | % High Viscosity SCMCel | % Ash | Average |
|---|---|---|---|
| 50 | none | 32.48 | 30.36 |
| 50 | none | 29.80 | |
| 50 | none | 28.81 | |
| 50 | 1 | 29.91 | 30.32 |
| 50 | 1 | 30.79 | |
| 50 | 1 | 30.27 | |
| 50 | 0.5 | 30.09 | 29.45 |
| 50 | 0.5 | 29.03 | |
| 50 | 0.5 | 29.22 | |
| 75 | 1 | 38.41 | 37.84 |
| 75 | 1 | 37.19 | |
| 75 | 1 | 37.93 | |
| 75 | 0.5 | 37.57 | 37.74 |
| 75 | 0.5 | 38.75 | |
| 75 | 0.5 | 36.89 | |

Example 9

Photostability Property of Chitosan Coated TiO$_2$

The photostability of samples of titanium dioxide R796 alone, or modified with 1% glycidylsiloxane (Gly-TiO$_2$), and treated with 1% high viscoity chitosan was tested. TiO$_2$ R796 was assayed as a control.

The photostability was measured as follows. TiO$_2$ or modified TiO$_2$ pigments were blended with 50% melamine solution to give 10% TiO$_2$ and 5% melamine concentration. Ashless filter paper strips were dipped into the above solution and dried in air (10 min) followed by oven drying at 100° C. for 7 min. Laminates of these papers were made. Layers of laminate consisted of layers of melamine treated sheet, white sheet, phenolic kraft sheet, and TiO$_2$-melamine treated sheet. The laminate contained between steel plates was pressed at 140° C. in a Carver Press and pressurized at 36,000 lbs for 6 min. It was then cooled to room temperature, and the color measurement (L*A*B*)of the resulting coupons were made on a Technobrite instrument. The samples were then exposed to UV light at 63° C. for 72 hr using an Atlas instrument and the color readings were made again. The difference in the color before and after UV exposure was reported as ΔE values (Table 8). The results showed that laminates containing TiO$_2$ coated with chitosan, with or without Gly modification, had less color change following UV treatment than the control R796 TiO$_2$.

TABLE 8

Photostabililty of laminates containing chitosan coated types of TiO$_2$.

| TiO$_2$ (R796) type | Change in color ΔE |
|---|---|
| Chitosan TiO$_2$ | 1.589 |
| Chitosan Gly-TiO$_2$ | 1.583 |
| TiO$_2$ | 1.7799 |

Example 10

Wet Strength Property of Chitosan Coated TiO$_2$

The wet strength of samples of hand sheets made with titanium dioxide R796 alone, or R796 treated with 1% high viscosity chitosan was tested. Handsheets were prepared with and without Kymene® wet strength agent, (Hercules, Wilmington, Del.). Hand sheets with no TiO$_2$ were assayed as a control. Wet strength was tested on 5 mm×6 mm samples using a fluid Dynemic Mechanical Analyzer (DMA) using water as the fluid.

Each paper specimen was cut with a die to a 6 mm width strip. It was then mounted in the jaws of a Tritec 2000 Dynamic Mechanical Analyzer (Triton Technology Limited, UK) set up in tension mode with a fluid bath. The sample length was 5 mm based on the set-up spacer, but was measured again for precision. The DMA was subject to stress strain at ambient temperature (23-25° C.) in the dry state at first and allowed to oscillate at 1 Hz for 10 minutes isothermally without applying force. At the 5 minutes mark, 80 ml of water was added to the fluid bath and it was held at ambient temperature. The ramping force started at the end of 10 minutes at a rate of 0.1 N/min until the sample broke. The stress was calculated from force/cross sectional area. The strain was calculated from the increased length/original length.

Figure 2:
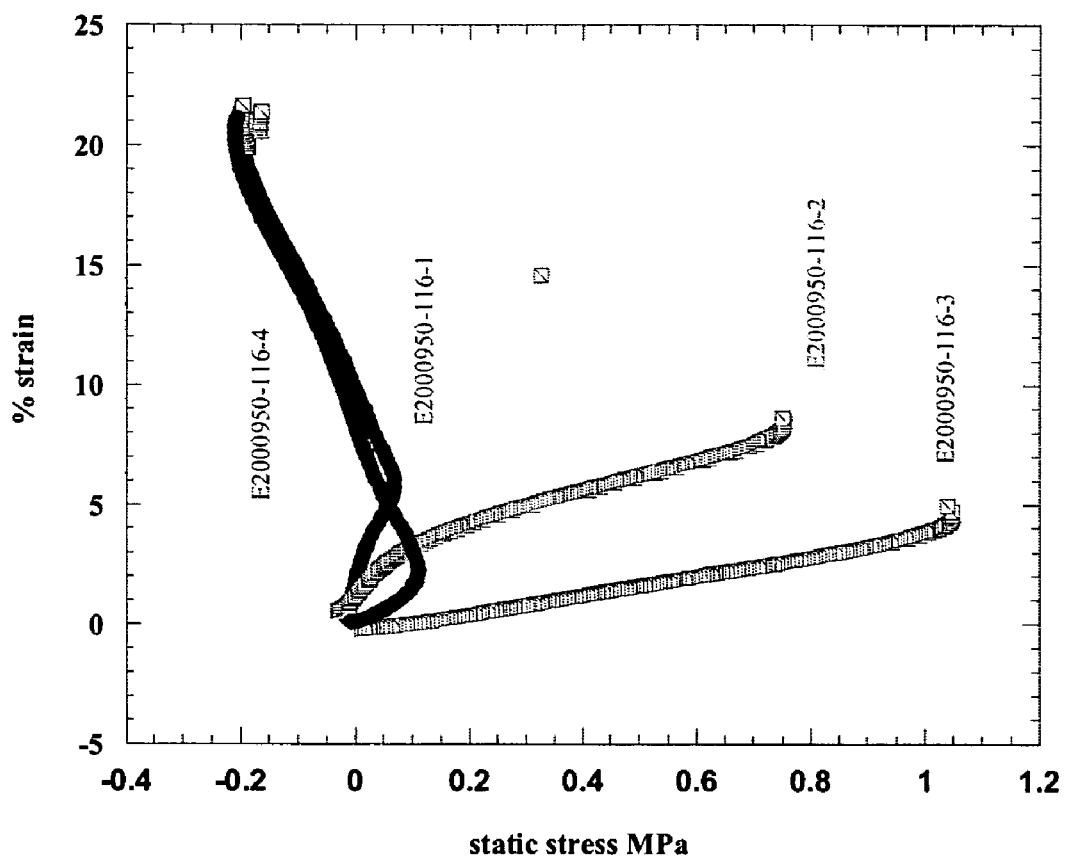
FIG. 2 shows a plot of wet strength measurements of chitosan coated $TiO_2$ paper and controls.

Results are graphed in FIG. 2. The pulp only control showed initial rapid increase in static force, and the paper yielded rapidly at 0.1 MPa to overcome the applied force and showed a negative stress. The R796 paper with Kymene® similarly showed initial rapid increase in static force, and the paper yielded rapidly at 0.15 MPa to overcome the applied force and showed a negative stress.

The chitosan-TiO$_2$ paper yielded at 0.75 MPa stress and 9% strain rapidly to 20% strain. The chitosan-TiO2 paper with Kymene® yielded at 1.05 MPa stress and 4% strain.

These results show that chitosan coating of TiO$_2$ greatly enhanced the wet strength of paper into which it is incorporated.

What is claimed is:

1. A composition comprising titanium dioxide particles at least partially coated with at least one polysaccharide component, said polysaccharide component comprising at least one compound selected from ionic natural polysaccharides and ionic derivatives of natural polysaccharides, the titanium dioxide particles comprising a surface treatment material selected from the group consisting of aluminum phosphate, organo-silane, and organo-siloxane and mixtures thereof.

2. The composition of claim 1 wherein the coating provides substantial encapsulation of the titanium dioxide particles.

3. The composition of claim 1 wherein the natural polysaccharide is a polyhexosamine.

4. The composition of claim 3 wherein the polyhexosamine is chitosan.

5. The composition of claim 1 wherein the ionic derivative of a natural polysaccharide is a carboxymethyl derivative.

6. The composition of claim 5 wherein the carboxymethyl derivative is carboxymethylchitosan or carboxymethylcellulose.

7. The composition of claim 1 wherein the polysaccharide component has a viscosity of at least about 25 centipoise when measured as a 1% solution in aqueous medium measured with a Brookfield LYT Viscometer.

8. The composition of claim 7 wherein the polysaccharide component in solution has a viscosity of at least about 2000 centipoise.

9. The composition of claim 1 wherein the polysaccharide component is present in an amount from about 0.1 to about 10 weight %, based on the total weight of the at least partially coated titanium dioxide particles.

10. The composition of claim 9 wherein the polysaceharide component is present in the amount of about 0.2 to about 5 weight %, based on the total weight of the at least partially coated titanium dioxide particles.

11. The composition of claim 1 wherein the organo-silane is at least one alkyl trialkoxysilane.

12. The composition of claim 11 wherein the alky trialkoxysilane is alkyltrimethoxysilane or alkyltriethoxysilane.

13. The composition of claim 1 wherein the organo-siloxane is (3-glycidoxypropyl) triethoxysiloxane or (3-aminopropyl) triethoxysiloxane.

14. A cellulose-based product comprising a composition comprising titanium dioxide particles at least partially coated with at least one polysaccharide component, said polysaccharide component comprising at least one selected from ionic natural polysaccharides and ionic derivatives of natural polysaccharides, the titanium dioxide particles comprising a surface treatment material selected from the group consisting of aluminum phosphate, organo-silane, and organo-siloxane and mixtures thereof.

15. The cellulose-based product of claim 14 wherein the product is a cellulose-based paper.

16. The cellulose-based product of claim 15 wherein the particles are dispersed within the paper.

17. A laminate paper comprising a composition comprising titanium dioxide particles at least partially coated with at least one polysaccharide component, said polysaccharide component comprising at least one selected from ionic natural polysaccharides and ionic derivatives of natural polysaccharides, the titanium dioxide particles comprising a surface treatment material selected from the group consisting of aluminum phosphate, organo-silane, and organo-siloxane and mixtures thereof.

18. The laminate paper of claim 17 further comprising a substantially unitary consolidated structure containing a plurality of layers, wherein at least one of the layers comprises the titanium dioxide particles.

19. A process for improving the retention by cellulosic fibers of titanium dioxide particles, comprising contacting the titanium dioxide particles in liquid phase with at least one ionic natural polysaccharide or ionic derivative of a natural polysaccharide, wherein the polysaccharide or ionic derivative of natural polysaccharide forms at least a partial coating on the surface of the particles, the titanium dioxide particles comprising a surface treatment material selected from the group consisting of aluminum phosphate, organo-silane, and organo-siloxane and mixtures thereof.

20. An antimicrobial composition comprising titanium dioxide particles at least partially coated with at least one polysaccharide component, said polysaccharide component comprising at least one compound selected from ionic natural polysaccharides and ionic derivatives of natural polysaccharides, the titanium dioxide particles comprising a surface treatment material selected from the group consisting of aluminum phosphate, organo-silane, and organo-siloxane and mixtures thereof.

21. A personal care composition comprising a composition comprising titanium dioxide particles at least partially coated with at least one polysaccharide component, said polysaccharide component comprising at least one compound selected from ionic natural polysaccharides and ionic derivatives of natural polysaccharides, the titanium dioxide particles comprising a surface treatment material selected from the group consisting of aluminum phosphate, organo-silane, and organo-siloxane and mixtures thereof.

22. The personal care composition of claim 21 wherein the composition is selected from the group consisting of skin cleansing compositions, make-up, facial lotions, cream moisturizers, body washes, body lotions, foot creams, hand creams, sunscreen creams and lotions, shaving lotions, cream depilatories, lotion depilatories, facial masks made with clay materials, lipstick, eyeshadow, foundation, anti-aging products, hair conditioners, and hair treatment creams.

23. A method for effecting the distribution of titanium dioxide particles in a cream comprising incorporating a composition comprising titanium dioxide particles at least partially coated with at least one polysaccharide component, said polysaccharide component comprising at least one compound selected from ionic natural polysaccharides and ionic derivatives of natural polysaccharides, the titanium dioxide particles comprising a surface treatment material selected from the group consisting of aluminum phosphate, organo-silane, and organo-siloxane and mixtures thereof.

24. A method for enhancing the sun protection of a sunscreen cream comprising incorporating in a cream formulation a composition comprising titanium dioxide particles at least partially coated with at least one polysaccharide component, said polysaccharide component comprising at least one compound selected from ionic natural polysaccharides and ionic derivatives of natural polysaccharides, the titanium dioxide particles comprising a surface treatment material selected from the group consisting of aluminum phosphate, organo-silane, and organo-siloxane and mixtures thereof.

25. A method for enhancing water resistance of a sunscreen cream comprising incorporating in a cream formulation a composition comprising titanium dioxide particles at least partially coated with at least one polysaccharide component, said polysaccharide component comprising at least one compound selected from ionic natural polysaccharides and ionic derivatives of natural polysaccharides, the titanium dioxide particles comprising a surface treatment material selected from the group consisting of aluminum phosphate, organo-silane, and organo-siloxane and mixtures thereof.

* * * * *

UNITED STATES PATENT AND TRADEMARK OFFICE
CERTIFICATE OF CORRECTION

PATENT NO. : 7,601,212 B2  Page 1 of 1
APPLICATION NO. : 11/511937
DATED : October 13, 2009
INVENTOR(S) : Sabesan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 172 days.

Signed and Sealed this

Fifth Day of October, 2010

David J. Kappos
*Director of the United States Patent and Trademark Office*